United States Patent
Baenziger et al.

(10) Patent No.: US 7,368,845 B2
(45) Date of Patent: May 6, 2008

(54) ELECTRICAL MACHINE WITH A ROTOR AND STATOR

(75) Inventors: Matthias Baenziger, Hausen (CH); Werner Ladstaetter, Daettwil (CH); Hrvoje Lukacic, Birr (CH); Walter Meier, Waltenschwil (CH); Francesco Stallone, Locarno (CH)

(73) Assignee: Alstom Technology Ltd, Baden (CH)

( * ) Notice: Subject to any disclaimer, the term of this patent is extended or adjusted under 35 U.S.C. 154(b) by 344 days.

(21) Appl. No.: 11/092,103

(22) Filed: Mar. 29, 2005

(65) Prior Publication Data

US 2006/0181165 A1 Aug. 17, 2006

(30) Foreign Application Priority Data

Mar. 31, 2004 (DE) .................. 10 2004 016 454

(51) Int. Cl.
*H02K 3/46* (2006.01)
(52) U.S. Cl. ........................ 310/260; 310/71
(58) Field of Classification Search .............. 310/71, 310/260, 270
See application file for complete search history.

(56) References Cited

U.S. PATENT DOCUMENTS

| | | | |
|---|---|---|---|
| 3,089,048 A | 5/1963 | Bahn et al. .............. 310/260 |
| 4,254,352 A | 3/1981 | Fidei et al. .............. 310/71 |
| 4,314,173 A * | 2/1982 | Srdoch .................. 310/260 |
| 5,485,050 A | 1/1996 | Zimmermann ............. 310/260 |

FOREIGN PATENT DOCUMENTS

| | | |
|---|---|---|
| DE | 1 200 932 | 9/1965 |
| DE | 44 06 400 | 8/1995 |
| JP | 010 77440 | 3/1989 |

* cited by examiner

*Primary Examiner*—Dang Le
(74) *Attorney, Agent, or Firm*—Darby & Darby

(57) ABSTRACT

An electric machine with a rotor and a stator, especially an electric motor or a generator, preferably for a power plant, wherein the stator has a winding with several winding bars which, in the area of an axial core face, are each connected via a phase connector bar to a terminal of the stator winding so as to be electrically conductive. Several phase connector bars extend between their ends in a ring segment manner along the circumference of the stator and rest internally and radially on at least one support. Several such supports are distributed along the circumference in the area of the core face. On at least one support, there is a phase connector bar between two stationary axial stops; with its inside, said phase connector bar is axially in contact with the first axial stop or with a spacer, and with its outside, it is axially in contact with the second axial stop or with a spacer. At least one pretensioning device is provided which uses axial spring force to press the phase connector bar against the corresponding axial stop and/or against the corresponding spacer so that contact is made.

16 Claims, 5 Drawing Sheets

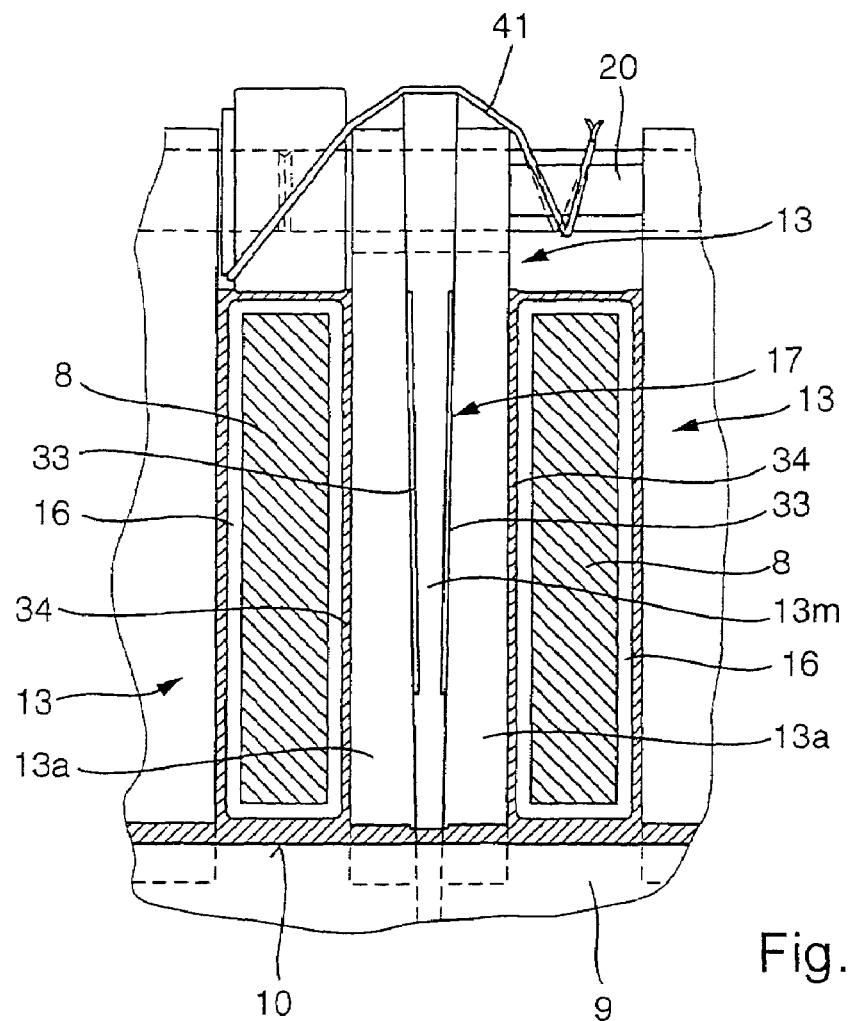
Fig. 7
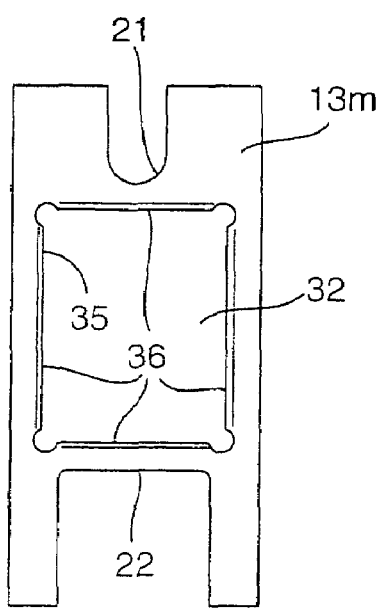
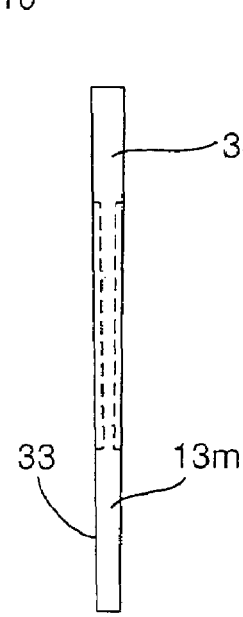
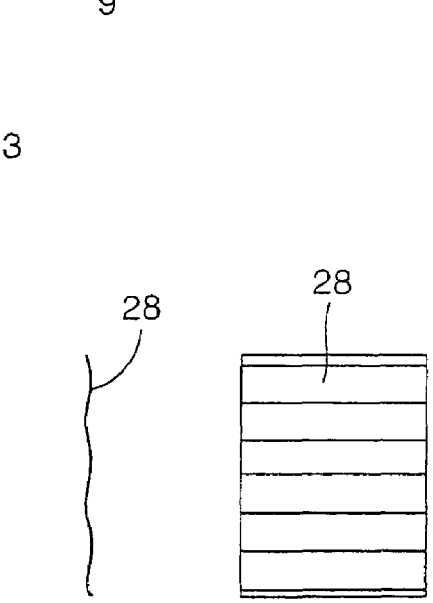
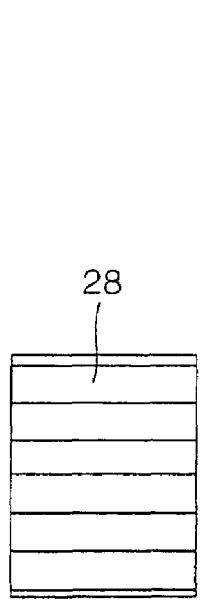
Fig. 8   Fig. 9   Fig. 10   Fig. 11

ELECTRICAL MACHINE WITH A ROTOR AND STATOR

This application claims priority to German Patent Application Ser. No. DE 10 2004 016 454.1, filed Mar. 31, 2004, the entire disclosure of which is hereby incorporated by reference herein.

The present invention relates to an electric machine with a rotor and a stator, especially an electric motor or a generator, preferably in a power plant.

BACKGROUND

When it comes to large machines of this type, particularly for generating electricity in a power plant, the stator has a winding made up of several winding bars. These winding bars, which are preferably configured as so-called Roebel bars, extend in the axial direction in a stator core. At least on one axial face of this stator core, the ends of the winding bars protrude out of the stator core. Normally, the protruding ends of the winding bars are bent and arranged in such a way that, on the core face, they form a truncated winding head whose cross section increases as the distance from the core face increases.

Normally, the stator winding of the electric machine is fitted with several terminals so that electric energy can be fed into and/or dissipated out of the stator winding, depending on whether the electric machine is configured or operated as an electric motor or as a generator. For this purpose, selected winding bars, so-called phase-winding bars, have to be connected to these terminals. This can be done, for instance, by means of phase connector bars, each of which connects one of the phase-winding bars in the area of the core face to one of the terminals.

As a rule, the phase connector bars extend between their ends in a ring segment manner along the circumference of the stator, whereby they rest internally and radially on one or more supports distributed in the area of the core face along the circumference. These supports can be provided with two stationary axial stops between which there is at least one phase-connector bar. Normally, there are several phase connector bars between the axial stops of the supports. Advantageously, spacers with which the phase connector bars come into axial contact are arranged between each of the adjacent phase connector bars in the area of the supports. Here, each of the phase connector bars located axially on the outside can either be in direct contact with the axial stop facing them or else, via another spacer, they can each be in indirect contact with the axial stop facing them. The spacers are advantageously dimensioned in such a way that, after the assembly, a press fit is created in the axial direction for the phase connector bars located between the axial stops. As a result, the phase connector bars are effectively affixed to the supports, which is necessary in view of the loads that occur during the operation of the electric machine.

As a rule, the outside of the phase connector bars are provided with insulation, normally a synthetic resin. When the resin hardens and due to the heat that is generated during the operation of the electric machines, settling phenomena can occur which can cause the insulation of the phase connector bars to yield slightly in the axial direction. As a result, the axial pressing in the press fit between the axial stops of the supports drops markedly which, during the continuous operation of the machine in question, can reduce the axial holding forces to such an extent that the spacers can move relative to the phase connector bars due to the occurring vibrations. This gives rise to abrasive effects, thus causing the destruction of the electric insulation of the phase connector bars. Moreover, under certain circumstances, the spacers can become completely detached and fall out, thereby rendering the axial holding of the phase connector bars unstable. These processes entail an undesired risk potential and require regular inspections and at times complex maintenance measures.

SUMMARY OF THE INVENTION

An object of the present invention is to provide an improved embodiment for an electric machine of the above-mentioned type so that an increased level of safety can be achieved between the axial stops of the supports, particularly for the axial fixation of the phase connector bars.

According to the present invention at least one pretensioning means or device is used involving axial spring force to press the phase connector bars located between the axial stops of each of the supports against the corresponding axial stop or against the corresponding spacer so that axial contact is made. This construction according to the invention has the advantage that settling phenomena that have an effect in the axial direction can be compensated for by the axial spring force, so that sufficient axial fixation or pressing of the phase connector bars between the axial stops of the supports is ensured at all times. After all, a pretensioning means that works with axial spring force is naturally elastic and springy in the axial direction. During the assembly, the pretensioning means are tensioned, that is to say, pressed together axially, as a result of which the desired axial pretensioning or pressing or spring force effect can be achieved. Thus, if axial settling phenomena occur during the operation of the machine, the compressed pretensioning means can expand axially in an appropriate manner, so that the phase connector bars and spacers that are in contact with each other between the axial stops continue to be pressed against each other. Even though the spring force drops during the compensating movement caused by the spring, this can nevertheless be taken into consideration in advance by suitably selecting the pretensioning. Therefore, with the machine according to the invention, increased safety can be ensured for the axial fixation of the phase connector bars.

In a preferred embodiment, such a pretensioning means can be integrated into one of the spacers. In this manner, the pretensioning means in question usually does not require additional installation space, so that no complex adaptation measures are needed to implement the invention in such an electric machine. Furthermore, with this embodiment, the conventional spacers can be replaced by spacers having an integrated pretensioning means within the scope of maintenance work in a conventional machine. In this vein, existing machines can be retooled relatively inexpensively so as to implement the invention.

In another embodiment, such a pretensioning means can be integrated into one of the axial stops. Here, too, the integral mode of construction strives to build a design that is as compact as possible. However, since this calls for a modification of the axial stop in question, this embodiment is particularly well-suited for new machines which can be configured according to the invention right from the start. More space is available for integrating the pretensioning means into the axial stop than is available for integration into a spacer. Accordingly, the pretensioning means integrated into the axial stop can be dimensioned considerably larger or stronger than a pretensioning means integrated into a spacer. In this manner, the pretensioning means integrated into the axial stop might be sufficient to adequately axially press all spacers and phase connector bars that are associated with this support while, if the pretensioning means is integrated into the spacers, it might be necessary to employ several spacers with an integrated pretensioning means in order to be able to achieve sufficient axial pressing. Thus, this could translate into a cost advantage despite the adaptation of the appertaining axial stop.

According to another particularly advantageous embodiment, on its end connected to the winding bar, at least one of the phase connector bars can have a union bow that has a support zone extending in the circumferential and axial directions. Moreover, at least one additional phase-connector bar extends in the circumferential direction radially towards the outside at a distance from the support zone. According to the invention, an additional pretensioning means is provided here that supports this additional phase-connector bar on the above-mentioned support zone with radial spring force. With this construction, individual phase connector bars can be radially supported between their ends, that is to say, on the section that is curved in the circumferential direction; the union bows needed to establish electric contact with the corresponding phase-connector bar can be used for this purpose, as a result of which they acquire a dual function. In this manner, additional support sites are created for the individual phase connector bars that are provided in the circumferential direction between the supports so as to improve the distribution of the load along the phase connector bars.

BRIEF DESCRIPTIONS OF THE DRAWINGS

Preferred embodiments of the invention are depicted in the drawings and will be explained in greater detail in the description below, whereby the same reference numerals refer to identical or similar or functionally equivalent components.

The invention is described in more detail below with reference to the drawings, in which:

FIG. 7 shows an enlarged view of detail VII from FIG. 6;

FIG. 8 shows a front view of a middle spacer in the embodiment according to FIG. 7;

FIG. 9 shows a side view of the middle spacer from FIG. 8;

FIG. 10 shows a side view of a wavy spring;

FIG. 11 shows a top view of the wavy spring from FIG. 10;

DETAILED DESCRIPTION

Figure 1:
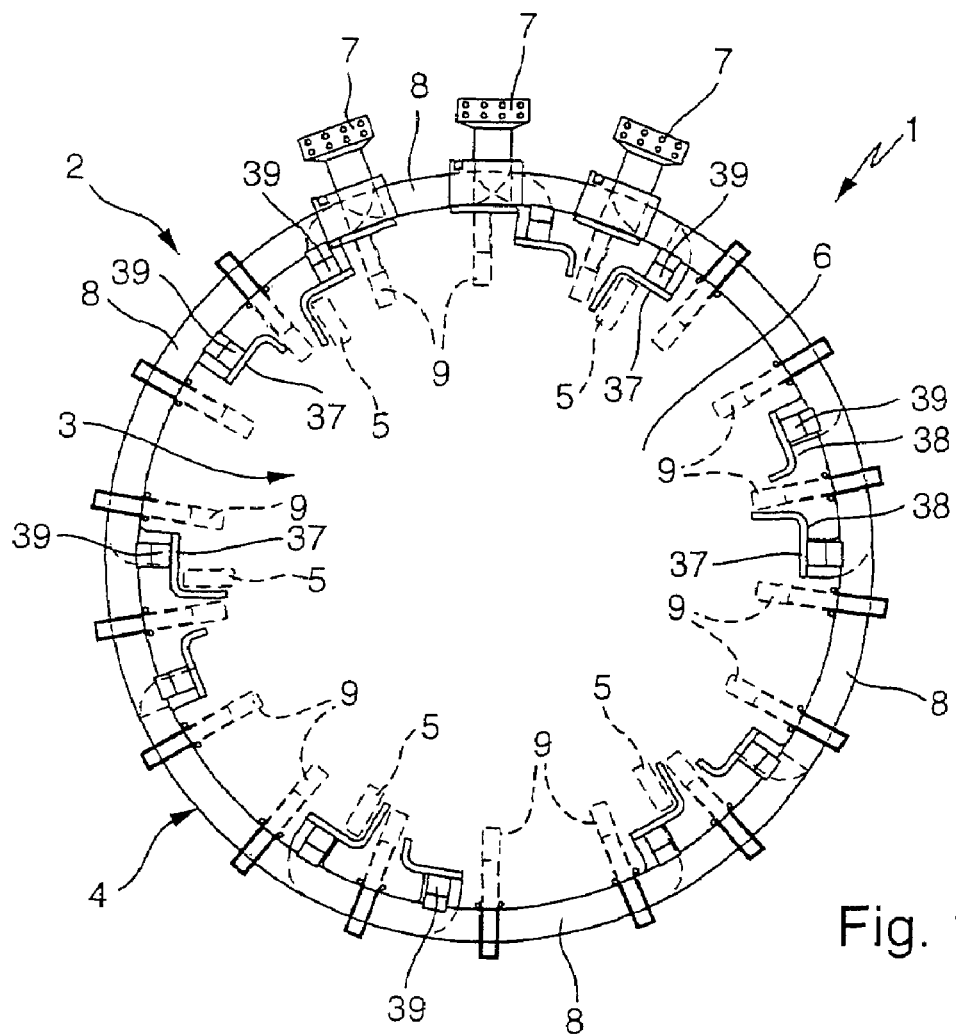
FIG. 1 shows an axial view of a core face of a stator of a machine according to the invention.

According to FIG. 1, an electric machine 1 according to the invention has at least one stator 2 and a rotor (not shown here) mounted therein so that it can rotate. For example, this electric machine 1 is an electric motor and/or a generator, especially an alternating-current machine. The electric machines 1 under consideration here are designed for relatively large capacities and are thus dimensioned relatively large. A preferred use of such machines 1 is, for example, for the generation of electricity in a power plant.

The stator 2 has a stator core 3 and a stator winding 4. This stator winding 4 is made up of a plurality of winding bars 5 which extend in the stator core 3 in the axial direction, that is to say, perpendicular to the drawing plane, and thus extend parallel to the axis of rotation of the rotor. The cross section of just a few winding bars 5, which can especially be configured as Roebel bars, are shown here with broken lines by way of example.

The ends of the winding bars 5 protrude out of the stator core 3 at least in one axial face 6 of the stator core 3 that faces the observer in FIG. 1. Preferably, the ends of the winding bars 5 that protrude from the stator core 3 are bent and arranged in such a way that they form a winding head (not shown here) on the core face 6. As a rule, such a winding head has the shape of a truncated cone that widens as the axial distance from the core face 6 increases. The ends of the winding bar are permanently attached to each other inside the winding head, as a result of which the winding head acts like an arch with respect to the pressing forces exerted radially from the outside towards the inside, so that it can dissipate the forces that occur in the circumferential direction. At the same time, extremely high axial forces on the outer circumference of the winding head that are directed away from the core face 6 can be introduced into the winding head. This construction makes it possible to pretension the winding bars 5 in the stator core 3 with high axial tractive forces or to absorb the loads that occur during the operation of the machine 1.

The stator winding 4 is fitted with several terminals 7 via which the electric energy can be fed into the machine 1 (in the case of an electric motor or of the operating state of an electric motor) or else can be dissipated out of the machine 1 (in the case of a generator or operating state of a generator). Only three such terminals 7 can be seen in the depiction according to FIG. 1 but a larger or smaller number of terminals 7 can be present.

Among the totality of all of the winding bars 5, a few selected winding bars 5, the so-called "phase-winding bars", are each connected to one of the terminals 7 so as to be electrically conductive. This connection is made in the area of the core face 6 and this is done by means of phase connector bars 8. Here, each (phase-)winding bar 5 provided for this purpose is connected to the appertaining terminal 7 via its own phase-connector bar 8 so as to be electrically conductive.

Since the winding bars 5 provided for the connection to the terminals 7 are distributed along the core face 6 in the circumferential direction and, for purposes of improved accessibility, the terminals 7 are advantageously located within a limited circumferential segment, the phase connector bars 8 exhibit different extensions in the circumferential direction so as to bridge the different distances between the appertaining winding bars 5 and the terminals 7. Therefore, as can be clearly seen in FIG. 1, between their ends, most of the phase connector bars 8 have a ring-segment shape and extend along the circumference of the stator 2 relative to the axis of rotation.

Several supports 9 are distributed along the circumference on the core face 6. The phase connector bars 8 are radially supported towards the inside either on none, on one or on several of these supports 9, depending on their position or extension along the circumference. The supports 9 thus affix the phase connector bars 8 onto the stator core 3 in the radial direction.

Figure 2:
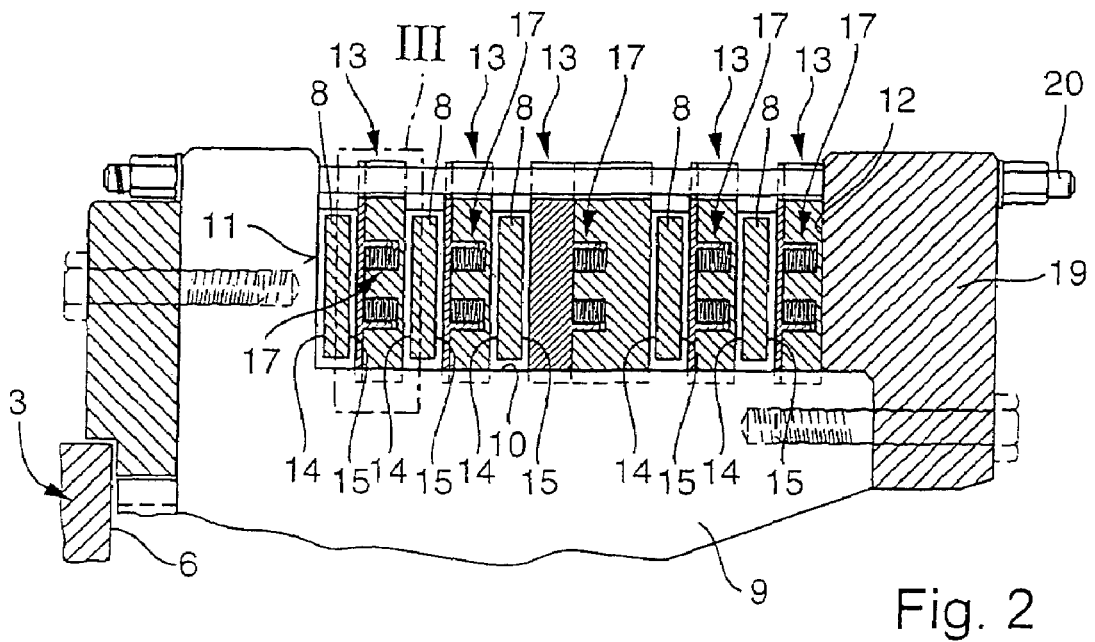
FIG. 2 shows a side view of a support.

FIG. 2 shows a side view of one of these supports 9. Accordingly, each support 9 has a support surface 10 that radially supports one or more phase connector bars 8. The support 9 shown in FIG. 2 is located in a circumferential segment of the winding head in which five phase connector bars 8 runs axially offset with respect to each other in the circumferential direction. In a corresponding manner, these five phase connector bars 8 on the support surface 10 are radially supported towards the inside on this support 9. It is evident that, depending on the position along the circumference, a larger or smaller number of phase connector bars 8 or else no phase-connector bar 8 can be supported on the appertaining support 9.

According to FIG. 2, the supports 9 that serve to support the phase connector bars 8 have two stationary axial stops, namely, a first axial stop 11 arranged closer to the core face 6 and another second axial stop 12 further away from the core face 6. Between these two axial stops 11, 12, which are located axially across from each other, there are phase connector bars 8 that are supported by the appertaining support 9. Here, a spacer 13 is arranged between each pair of phase connector bars 8. Accordingly, adjacent phase connector bars 8 are never axially in contact with each other. Rather, the inside 14 of each phase-connector bar 8 facing the stator core 3 is axially in contact with either a first axial stop 11 or with one of the spacers 13, and the outside 15 of each phase-connector bar 8 facing away from the core face 6 is axially in contact with either the second axial stop 12 or with one of the spacers 13.

In this context, the spacers 13 are dimensioned in terms of their axial extension in such a way that the spacers 13 are axially pressed against the phase-connector bar 8 between the axial stops 11, 12 after the assembly. As a result, a positive fixation in the axial direction and a non-positive fixation in the circumferential direction are achieved for the phase connector bars 8.

In order to ensure increased safety for this fixation if settling phenomena occur, for example, in the area of an electric insulation 16 (see FIGS. 3 and 4) of the phase connector bars 8 during the operation of the machine 1, the machine 1 according to the invention has at least one pretensioning means or pretensioning device 17 in the area of the supports 9. Five such pretensioning means 17 are provided in the embodiment depicted in FIG. 2. Each of these pretensioning means 17 is designed in such a way that, in the installed state, it generates an axial spring force that acts between the axial stops 11, 12 on the assembly consisting of phase-connector bars 8 and spacers 13 in such a way that each phase-connector bar 8 is axially pressed against the corresponding axial stop 11 or 12 and/or against the corresponding spacer 13. If, during the operation of the machine 1, settling phenomena occur that would lead to axial shrinkage of the assembly consisting of spacers 13 and phase connector bars 8, the spring force of the pretensioning means 17 can compensate for this. In this process, a spring element 18 (see FIGS. 3 and 4) provided for generating the spring force continues to press the phase connector bars 8 and the spacers 13 axially against each other and against the axial stops 11, 12.

For this purpose, the spring element 18 is tensioned during the assembly, that is to say, pressed together axially, as a result of which the desired spring pretensioning is generated. In the case of settling phenomena, the spring element 18 can then expand axially accordingly, as a result of which it is ensured that the phase connector bars 8 and the spacers 13 remain pressed in the axial direction against each other as well as against the axial stop or stops 11, 12. Even though the spring force of the spring element 18 necessarily diminishes during its axial expansion, the spring pretensioning applied during the assembly can be selected at such a magnitude that even after a maximum axial shrinkage of the assembly consisting of spacers 13 and phase connector bars 8 that can be expected during operation, there is still sufficient axial compression inside the assembly so as to ensure the desired fixation of the phase connector bars 8 axially and along the circumference.

In the embodiment shown in FIG. 2, the pretensioning means 17 are each integrated into the spacers 13. In this manner, for instance, conventional spacers can be replaced by spacers 13 provided with an integrated pretensioning means 17 in order to retrofit the invention in a conventional machine 1. Advantageously, all of the spacers 13 are fitted with an integrated pretensioning means 17 so as to be able to generate the largest possible pretensioning or spring force between the axial stops 11, 12. Naturally, the spacers 13 can also easily be employed without integrated pretensioning means 17 in other embodiments.

According to FIG. 2, the first axial stop 11 is advantageously shaped directly onto the support 9 or else shaped in one piece onto it. In contrast, the second axial stop 12 is realized by means of a separate component that is then attached to the support 9. Here, it is particularly advantageous to have an embodiment in which, for purposes of realizing the second axial stop 12, a shared support ring 19 configured as a separate component is employed for all of the supports 9, said support ring 19 being permanently connected to the individual supports 9. As a result, a sort of supportive cage is created inside which the supports 9 are radially supported via the support ring 19. In order to connect the support ring 19 to the supports 9, a tie rod 20 can be provided for at least individual supports 9, said tie rod 20 ultimately connecting the two axial stops 11, 12 to each other. This tie rod 20 serves to absorb the spring forces generated between the axial stops 11, 12 by the pretensioning means 17, so that the force flow is closed.

Figure 3:
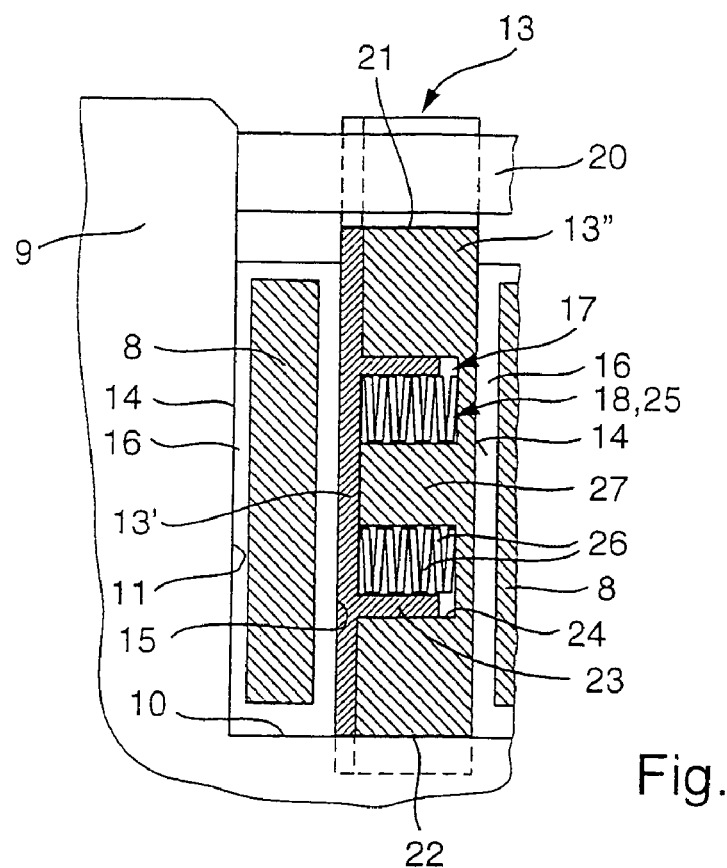
FIG. 3 shows an enlarged detail III from FIG. 2.
Figure 4:
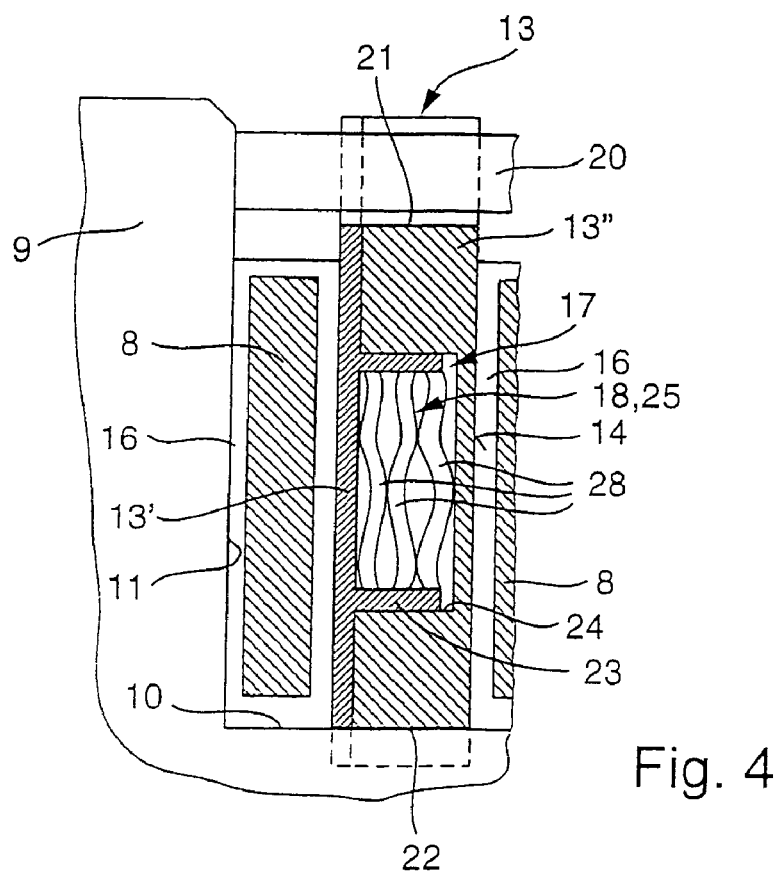
FIG. 4 shows a different embodiment of detail III from FIG. 2 in an enlarged view.

According to FIGS. 3 and 4, the spacer 13 can have a recess 21—U-shaped in the axial viewing direction—on an outside facing the tie rod 20, whereby the tie rod 20 engages into this recess 21. In this manner, the spacer 13 is positively secured on the support 9 in the area of the tie rod 20. In addition or as an alternative to this, the spacer 9 can have a receptacle 22—U-shaped in the axial viewing direction—on an inside facing the support surface 10, whereby the support 9 engages into this receptacle 22. In this manner, the spacer 13 is positively secured on the support 9 in the area of the support surface 10. In this context, it is essential that the spacer 13 is positively secured in the area of the tie rod 20 and/or in the area of the support surface 10 both radially and in the circumferential direction, but not axially, so that the spacer 13 itself can be moved axially along the support surface 10.

In the embodiments shown in FIGS. 3 and 4, the spacer 13 is axially divided into two, thus comprising two spacer parts 13' and 13". These two spacer parts 13' and 13" can be moved axially relative to each other. For this purpose, one spacer part 13' has, for example, an axially projecting collar 23 that engages into a recess 24 that is complementarily shaped in the other spacer part 13", thereby forming an axial guide. Then, the pretensioning means 17 integrated into this spacer 13 is arranged between the two spacer parts 13' and 13" in such a way that its spring force presses the two spacer parts 13' and 13" away from each other in the axial direction. For this purpose, the pretensioning means 17 or its spring element 18 is inserted into the above-mentioned recess 24 in such a way that it can rest axially on the two spacer parts 13' and 13".

In the embodiment according to FIG. 3, the spring element 18 is formed by a spring arrangement 25 that here comprises several disk springs 26 lying above each other. As a result, these disk springs 26 form a disk spring pack which allows the generation of extremely high spring forces with small axial strokes. Here, the disk springs 26 have central holes and are slipped onto a guide mandrel 27 that is formed inside the recess 24 on one of the spacer parts 13".

In contrast to this, the spring element 18 in the embodiment according to FIG. 4 is formed by a spring arrangement 25 made up of several wavy springs 28 or wavy ribbed springs. For instance, the wavy springs 28 can be stacked on top of each other with a different orientation of the waves, as a result of which a compact spring arrangement 25 can be achieved here as well which generates very high spring forces with small axial strokes.

The embodiments shown here for the pretensioning means 17 or for its spring element 18 are given purely by way of example and should not be construed as a restriction of the general applicability.

Figure 5:
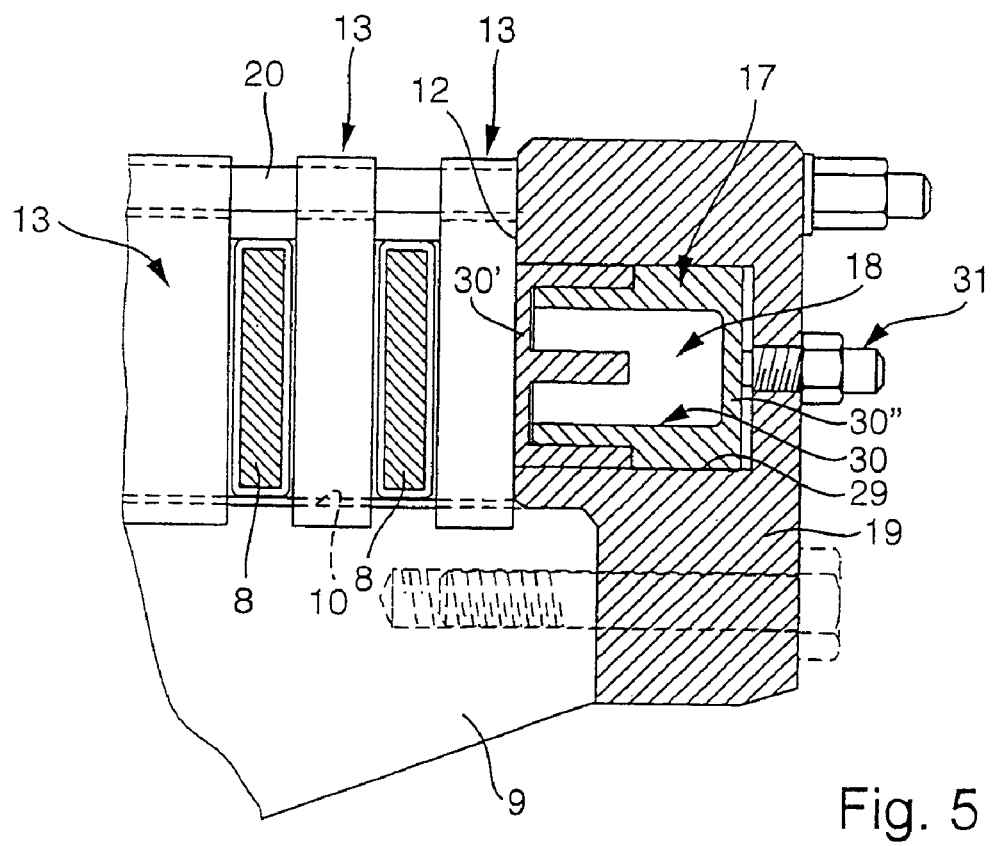
FIG. 5 shows a side view of a different embodiment of the support shown in FIG. 2.

According to FIG. 5, in another embodiment, the pretensioning means 17 can be integrated into one of the axial stops 11, 12. As shown in FIG. 5, this is preferably done at the second axial stop 12 or at the support ring 19 that forms the second axial stop 12. For this purpose, the support ring 19 on the second axial stop 12 has a receptacle 29 into which the pretensioning means 17 is inserted. Here, this receptacle 29 is open towards the other axial stop, that is to say, the first axial stop 11 in this case.

Since in the area of the axial stop 11, 12 in question, especially in the support ring 19, there is a relatively large space available, the pretensioning means 17 integrated into it can be dimensioned considerably stronger than a pretensioning means 17 that is integrated into one of the spacers 13. Accordingly, depending on the mode of application, it can be sufficient for just this one pretensioning means 17 integrated into the axial stop 11 or 12 to be provided on the appertaining support 9. It goes without saying that, in other embodiments, an additional pretensioning means 17 can be provided in at least one of the spacers 13.

Fundamentally, the pretensioning means 17 integrated into the appertaining stop 11, 12 can have the same structure as a pretensioning means 17 integrated into a spacer 13, so that in this context, reference is hereby made to the elaborations above. In the embodiment depicted in FIG. 5, the pretensioning means 17 has a housing 30 divided into two in the direction of the spring force, said housing correspondingly comprising two housing parts 30' and 30". These two housing parts 30' and 30" can be moved axially with respect to each other in the direction of the spring force, in other words, axially relative to each other, for which purpose the two housing parts 30' and 30" are inserted into each other in a telescope-like fashion. Now the spring element 18 is arranged inside the housing 30 between the two housing parts 30' and 30" and is supported on both housing parts 30' and 30" in such a way that its spring force presses the two housing parts 30' and 30" away from each other in the direction of the spring force. In this context, the pretensioning means 17 is integrated into the axial stop 11 or 12 in such a manner that the direction of the spring force is oriented axially so that the desired axial spring pretensioning can be introduced into the assembly consisting of the spacers 13 and the phase connector bars 8.

In the special embodiment shown here, a readjustment means 31 is also provided for the pretensioning means 17, said readjustment means allowing an axial positioning of the pretensioning means 17 inside the receptacle 29. This positioning can be effectuated from the outside, that is to say, on the side facing away from the phase connector bars 8, in other words, in the assembled state. Here, the readjustment means 31 is in the form of a screw that can be screwed through the support ring 19 into the receptacle 29, where it allows an axial adjustment of the housing 30 or of the appertaining housing part 30" and where it can be secured on the support ring 19 by means of a lock nut. In this manner, adjustments can be made on the pretensioning means 17 within the scope of maintenance work so as to compensate for any loss in pretensioning that might have been caused by the compensation of settling phenomena.

Fundamentally, the spring element 18 in the pretensioning means 17 integrated into the axial stop 11, 12 can be structured in the same way as a pretensioning means 17 integrated into one of the spacers 13 and it can consist, for example, of a spring arrangement 25 made of disk springs 26 or wavy springs 28.

Figure 6:
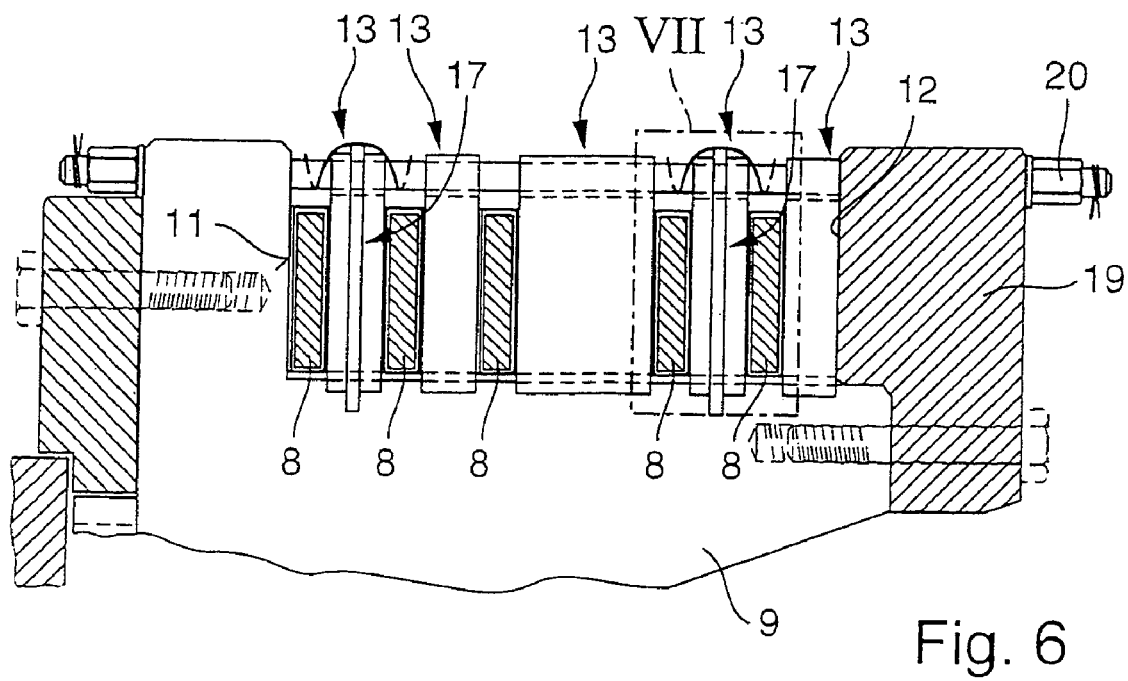
FIG. 6 shows a view as in FIG. 5, but of another embodiment.

FIG. 6 shows another embodiment of a pretensioning means 17 according to the invention which is integrated into a spacer 13. Here, too, there are five spacers 13 whereby, in contrast to the variant according to FIG. 2, only two of these spacers 13 are provided with such a pretensioning means 17. Here, too, it is fundamentally possible to have a different number of spacers 13 with an integrated a pretensioning means 17.

According to FIG. 7, in this special embodiment, the spacer 13 is axially divided into three, thus encompassing a middle spacer 13m as well as two outer spacers 13a. The middle spacer 13m has the pretensioning means 17 which is arranged here in such a way that, with the spring force, it presses the two outer spacers 13a axially away from each other or away from the middle spacer 13m.

According to FIG. 8, the middle spacer 13m can have a central receiving opening 32 into which the pretensioning means 17 can be inserted. Moreover, the middle spacer 13m has the U-shaped recesses 21 and 22 already mentioned above regarding FIGS. 3 and 4, whereby the tie rod 20 or the support 9 can engage into this recess.

As can be seen in FIGS. 7 and 9, the middle spacer 13m can be in contact with at least one axial side 33, here with both axial sides 33, via wedge surfaces on the outer spacer 13a arranged on the appertaining outside 33. Here, the wedge surfaces that are in contact with each other are harmonized with each other in terms of their wedge angle in such a way that the outsides 34 of the two outer spacers 13a, which face away from each other, run parallel to each other and extend radially and in the circumferential direction. The interacting wedge surfaces are also oriented in such a manner that a radial movement of the middle spacer 13m relative to the appertaining outer spacer 13a necessarily brings about an axial movement of the appertaining outer spacer 13a relative to the middle spacer 13m. Here, too, this mode of construction creates the possibility of readjusting the pretensioning means 17. Following the occurrence of settling, the middle spacer 13m can be driven radially inwards deeper between the two outer spacers 13a, whereby their outsides 34 move axially away from each other. At the same time, this causes the pretensioning means 17 situated on the inside to become tensioned once again.

According to FIGS. 6 and 7, the middle spacer 13m can be suitably affixed and secured in its selected or readjusted radial relative position vis-à-vis the appertaining outer spacers 13a. In the embodiments shown here, this fixation and securing are done, by way of example, employing a wire 41 that can be made, for instance, of steel, fiberglass, carbon fiber or the like.

In the embodiment depicted in FIGS. 6 and 7, the pretensioning means 17 can be formed, for example, by one or more wavy springs or wavy ribbed springs 28 which are shown in two different views in FIGS. 10 and 11. Preferably, two wavy springs 28 are inserted into the receiving opening 32, namely, one on each axial side 33. Preferably, the middle spacer 13m can form lateral shoulders 36 on an edge 35 that delimits the receiving opening 32, whereby the wavy springs 28 can be laid on the edge of said lateral shoulders 36.

Getting back to FIG. 1, it can be seen that, for purposes of establishing electric contact with the corresponding winding bar 5, at least some of the phase connector bars 8 have a union bow 37 on their end that is at a distance from the corresponding terminal 7. These union bows 37 are each angled away from the corresponding phase-connector bar 8 in such a way that they each have a support zone 38 extending radially towards the outside in the circumferential and axial directions. Moreover, it can be clearly seen in FIG. 7 that at least one additional phase-connector bar 8 extends radially towards the outside in the circumferential direction at a distance from the union bows 37 or from their support zones 38. According to a particularly advantageous embodiment of the present invention, at least one additional pretensioning means 39 can be provided that is arranged and configured in such a way that, in the area of a union bow 37, this additional pretensioning means 39 is supported with radial spring force on the support zone 38 of the union bow 37 as well as on at least one phase-connector bar 8 that is radially adjacent thereto towards the outside. In this manner, additional radial support sites are created for the phase-connector bars 8 between the supports 9, which is advantageous in terms of the loads that occur during operation.

Figure 12:
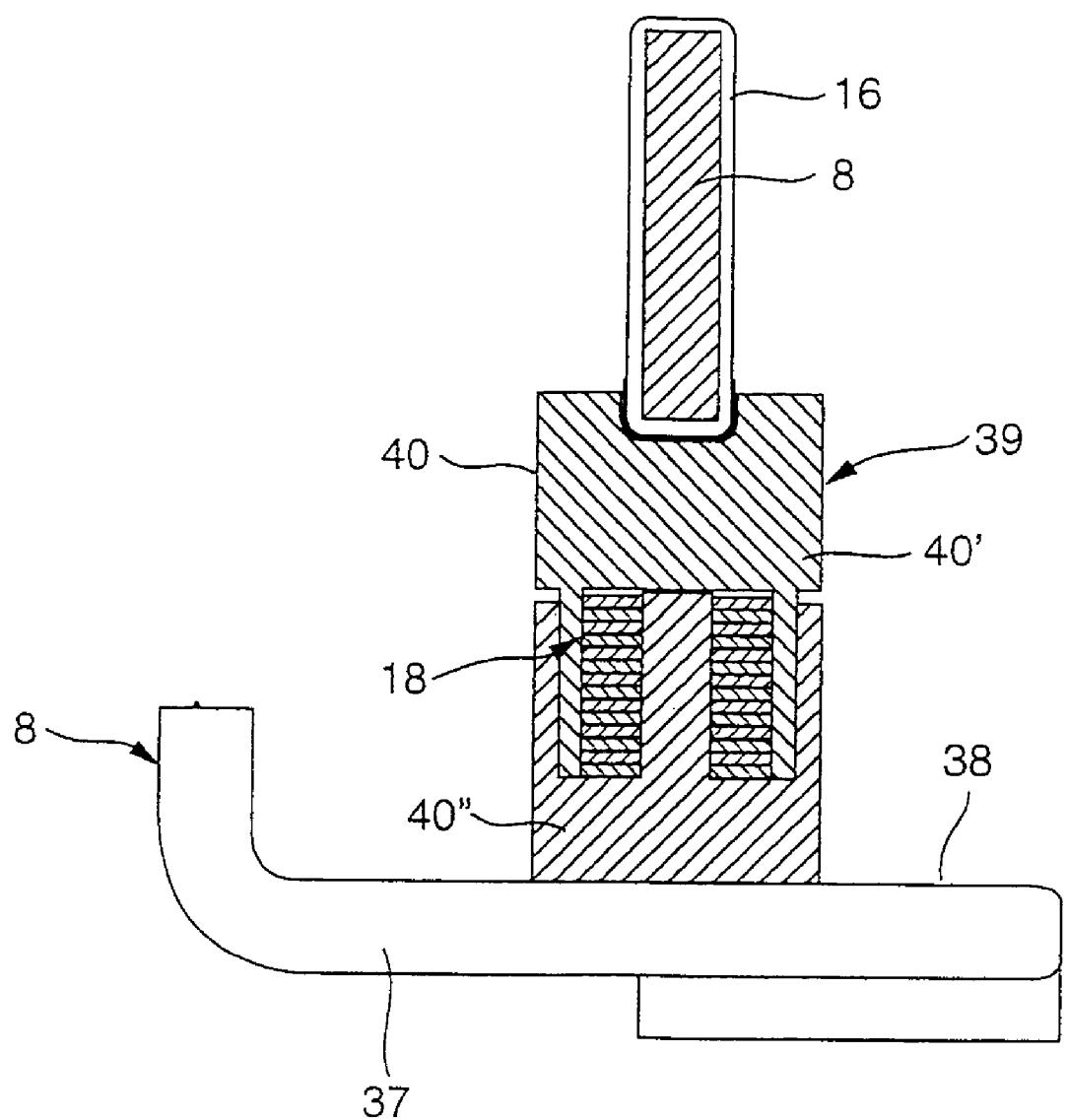
FIG. 12 shows a side view of a radially active pretensioning means.

According to FIG. 12, this additional pretensioning means 39 that acts in the radial direction can fundamentally have the same structure as the pretensioning means 17 (see FIG. 5) that is integrated into the second axial stop 12. Accordingly, this pretensioning means 39 has a two-part housing 40 (shown in abbreviated form) whose housing parts 40' and 40" can be moved relative to each other in the direction of the spring action, that is to say, radially here, and are, for example, inserted into each other in a telescope-like fashion. A spring element 18 is once again inserted into the housing 40 between the two housing parts 40' and 40" in the direction of spring force, said spring element 18 then pressing the two housing parts 40' and 40" away in the direction of the spring action. By way of example, the spring element 18 is configured here in the form of a disk spring pack.

What is claimed is:

1. An electric machine comprising:
   a rotor
   a stator having a core and a winding with a plurality of winding bars;
   at least one terminal;
   a plurality of supports distributed along a circumference of the stator in the area of an axial face of the core;
   a plurality of phase connector bars having a ring-segment shape extending along the circumference of the stator and resting on an internal radial side on at least one of the plurality of supports, each phase connector bar connecting one of the winding bars to the at least one terminal in the area of the axial face of the core so as to be electrically conductive, wherein at least one of the plurality of supports includes first and second stationary axial stops and supports at least one phase connector bar between the two axial stops so that an inside of the at least one phase connector bar facing the stator core is axially in contact with one of the first axial stop and a first spacer and so that an outside of the at least one phase connector bar facing away from the stator core is axially in contact with one of the second axial stop and a second spacer; and
   a pretensioning device exerting an axial spring force pressing the at least one phase connector bar against at least one of the first axial stop, the second axial stop, the first spacer, and the second spacer.

2. The machine as recited in claim 1, wherein the machine is at least one of an electric motor and a generator.

3. The machine as recited claim 2, wherein the at least one of the electric motor and generator are for a power plant.

4. The machine as recited claim 1, wherein the pretensioning device is integrated into one of the first axial stop, the second axial stop, the first spacer, and the second spacer.

5. The machine as recited claim 1, wherein the pretensioning device is integrated into one of the first and second spacers, the spacer being axially divided into two spacer parts axially moveable with respect to each other, the pretensioning device being axially arranged between the two spacer parts, axially pressing them away from each other using the spring force.

6. The machine as recited claim 1, the pretensioning device is integrated into one of the first and second spacers, the spacer being is axially divided into a middle spacer part and two outer spacer parts, the pretensioning device being disposed on the middle spacer part, which presses the two outer spacer parts axially away from each other using the spring force.

7. The machine as recited claim 6, wherein at least one of the outer spacer parts includes wedge surfaces in contact with an axial side of the middle spacer part, the wedge surfaces being oriented in such a manner that a radial movement of the middle spacer part relative to the at least one outer spacer part causes an axial movement of the at least one outer spacer part relative to the middle spacer part.

8. The machine as recited claim 1, wherein the pretensioning device is integrated into one of the first and second axial stops and wherein the axial stop fitted with the pretensioning device has a receptacle open towards the other axial stop for receiving the pretensioning device.

9. The machine as recited claim 8, wherein the axial stop fitted with the pretensioning device includes a readjustment device configured to position the pretensioning device axially from outside the axial stop.

10. The machine as recited claim 1, further comprising a tie rod connecting the first and second axial stops and radially positively securing each spacer disposed between the first and second axial. stops.

11. The machine as recited claim 1, wherein the first axial stop formed directly on the support.

12. The machine as recited claim 11, wherein the second axial stop is formed on a shared supporting ring configured as a separate component that is permanently connected to the at least one support.

13. The machine as recited claim 1, wherein the second axial stop is formed on a shared supporting ring configured as a separate component that is permanently connected to the at least one support.

14. The machine as recited claim 1, wherein at least one of the phase connector bars has a union bow on an end connected to the winding bar, the union bow having a support zone extending radially in the. circumferential and axial directions, and further comprising an additional phase connector bar disposed radially towards the outside and at a distance from the support zone and extending in the circumferential direction, and an additional pretensioning means supporting the additional phase connector bar on the support zone with radial spring force.

15. The machine as recited claim 1, wherein, the pretensioning device includes a spring element configured to generate the spring force, the spring element including at least one of a disk spring and a wavy spring.

16. The machine as recited claim 1, wherein the pretensioning device has a housing divided into two housing parts in the direction of the spring force, the housing parts being moveable relative to each other in the direction of the spring force and being pressed away from each other in the direction of the spring force by the spring force.

* * * * *